United States Patent [19]

Maddalone

[11] Patent Number: 5,169,534
[45] Date of Patent: Dec. 8, 1992

[54] METAL ION AND ORGANIC CONTAMINANT DISPOSAL

[75] Inventor: Raymond F. Maddalone, Long Beach, Calif.

[73] Assignee: TRW Inc., Redondo Beach, Calif.

[21] Appl. No.: 751,021

[22] Filed: Aug. 28, 1991

[51] Int. Cl.$^5$ .............................................. C02F 9/00
[52] U.S. Cl. .................................. 210/667; 210/669; 210/679; 210/688; 210/694; 210/747; 431/2
[58] Field of Search ............. 210/667, 669, 679, 688, 210/694, 908–910, 912–914, 747; 431/2

[56] References Cited

U.S. PATENT DOCUMENTS

| | | | |
|---|---|---|---|
| 3,932,494 | 1/1976 | Yoshida et al. | 210/688 |
| 4,054,421 | 10/1977 | Robinson et al. | 44/1 F |
| 4,070,282 | 1/1978 | Otto | 210/27 |
| 4,083,801 | 4/1978 | Das | 252/422 |
| 4,237,101 | 12/1980 | Willard, Sr. | 423/20 |
| 4,257,869 | 3/1981 | Dickert, Jr. et al. | 208/8 LE |
| 4,260,471 | 4/1981 | Miller | 208/8 LE |
| 4,305,827 | 12/1981 | Sasaki | 210/688 |
| 4,434,043 | 2/1984 | Singhal et al. | 208/10 |
| 4,480,559 | 11/1984 | Blaskowski | 431/2 |
| 4,497,636 | 2/1985 | Aida et al. | 44/15 R |
| 4,516,980 | 5/1985 | Wheelock | 44/1 S R |
| 4,519,921 | 5/1985 | Russ et al. | 210/716 |
| 4,525,283 | 6/1985 | Horak et al. | 210/909 |
| 4,545,891 | 10/1985 | Meyers et al. | 208/11 R |
| 4,558,022 | 12/1985 | Farmerie | 502/25 |
| 4,618,346 | 10/1986 | Schapiro et al. | 44/1 A |
| 4,649,031 | 3/1987 | Matyas et al. | 423/20 |
| 4,663,047 | 5/1987 | Krauthausen et al. | 210/616 |
| 4,676,908 | 6/1987 | Ciepiela et al. | 210/638 |
| 4,741,741 | 5/1988 | Salem et al. | 44/621 |
| 4,743,271 | 5/1988 | Kindig et al. | 44/621 |
| 4,755,296 | 7/1988 | Ying et al. | 210/631 |
| 4,857,203 | 8/1989 | Pope et al. | 210/681 |
| 4,859,212 | 8/1989 | Chriswell et al. | 44/622 |
| 5,059,307 | 10/1991 | Meyers et al. | 208/404 |
| 5,085,764 | 2/1992 | Meyers et al. | 208/404 |

Primary Examiner—Ivars Cintins
Attorney, Agent, or Firm—Michael B. Farber; Sol L. Goldstein

[57] ABSTRACT

An improved process for disposal of aqueous hazardous waste is based on the finding that caustic-treated coal that is substantially hydrophilic and self-combusting can combine with contaminants present in water, including organic contaminants and metal ion contaminants. Contacting of the coal with contaminant-containing water results in the production of contaminant-containing coal and reduction of the content of contaminant in the water by at least about 80% by weight. When the contaminant-containing coal is burned in the presence of a slagging agent, the organic contaminants are destroyed by combustion and the metal ion contaminants are encapsulated in slag, for safe disposal. Several integrated treatment methods are disclosed for aqueous waste, such as ground water, based on this finding. The caustic-treated coal used in a process of the present invention can be subjected to several treatments, including washing steps for removing mineral matter and/or sulfur from the coal to yield caustic-treated coal with reduced mineral matter and sulfur content. Alternatively, the coal can be treated with a water-soluble primary or secondary amine and carbon disulfide in the presence of water of modify its surface.

47 Claims, 5 Drawing Sheets

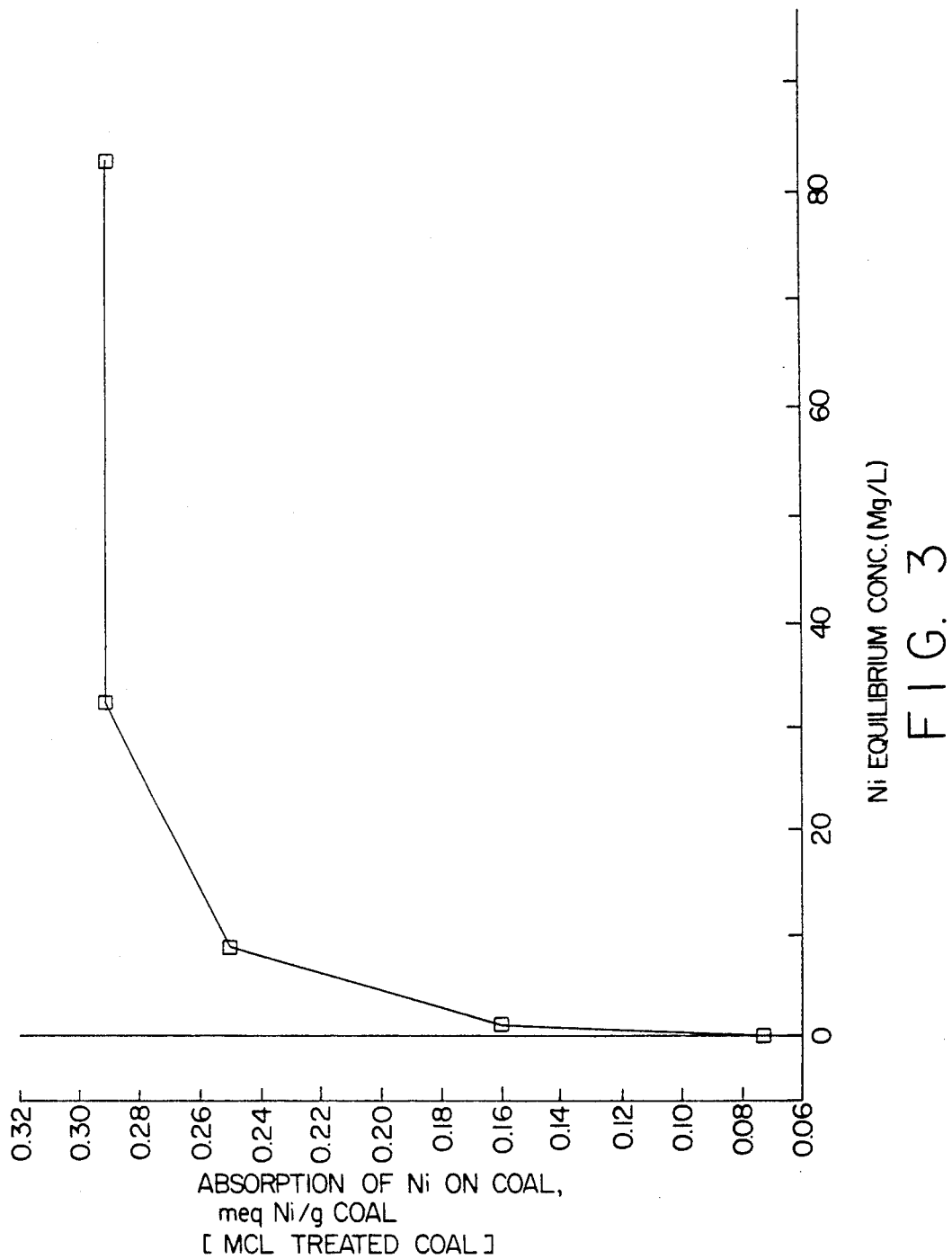

METAL ION AND ORGANIC CONTAMINANT DISPOSAL

BACKGROUND OF THE INVENTION

This invention is directed to methods of detoxification and disposal of hazardous aqueous liquid wastes.

Ground water and waste water around hazardous waste sites contain heavy metals and toxic organic compounds. These contaminants are strongly suspected of causing cancer, birth defects, and other illnesses. Cleanup of the waste requires that these hazardous materials be removed, and the resulting waste products stabilized or detoxified. This is a problem of national concern, and the Environmental Protection Agency, through its Superfund program, has identified hundreds of sites throughout the country, including the Stringfellow Acid Pits near Riverside, Calif., which are seriously contaminated with hazardous waste.

Present methods of dealing with these wastes are unsatisfactory. Rather than permanent disposal or detoxification, cleanup of these sites has generally meant redrumming the wastes for burial in a landfill. This only postpones the problem and is no long-term solution. Accordingly, there is a pressing need for a method of permanent detoxification and disposal of hazardous liquid waste in order to permanently resolve the problems presented by sites such as the Superfund sites. Preferably, such a method should be able to be operated directly at the site and to deal with both metal ion contaminants, including ions of heavy metals, and toxic organic contaminants.

SUMMARY

The present invention is directed to a process that meets these needs. The process employs caustic-treated coal that is substantially hydrophilic and self-combusting to remove contaminants present in feed water such as aqueous hazardous wastes. The contaminants capable of being removed for disposal by this process include: (1) metal ion contaminants, including metal ions of heavy metals; and (2) organic contaminants, including aromatic organic contaminants.

An advantage of this process is that after the coal is used to remove the contaminants from the feed water, the coal can be burned under self-combusting conditions in the presence of a slagging agent so that the organic contaminants are destroyed through combustion and the metal ion contaminants are safely encapsulated in slag for disposal. The water that has been reduced in contaminant content can also be removed from the coal for reintroduction into a groundwater reservoir or other use.

In general, a process according to the present invention for removing a contaminant from feed water, the feed water containing at least one contaminant selected from the group consisting of organic contaminants and metal ion contaminants, comprises the steps of:

(1) providing a caustic-treated coal that is self-combusting, having sufficient hydrogen present to be capable of ignition, and substantially hydrophilic; and (2) contacting the caustic-treated coal with a feed water at a feed water to coal mass ratio of from about 50:1 to about 20,000:1 for combining the contaminant with the coal, thereby generating contaminant-containing coal and reducing the content of contaminant in the feed water by at least about 80% by weight, the contaminant-containing coal being suitable for self-supporting combustion for disposing of the contaminant.

Preferably, the content of contaminant in the water is reduced by a still greater degree, such as by at least 90% or 95% by weight.

The process can further include the preliminary step of contacting the feed water with alkali prior to contacting the water with the caustic-treated coal to raise the pH of the feed water to a pH in the range of from about 7 to about 9 to provide optimal combination of the contaminant with the coal.

The process can further comprise the step of treating the caustic-treated coal with at least one water-soluble primary or secondary amine and carbon disulfide in the presence of water in order to increase the capability of the coal to combine with contaminants, particularly metal ions. The amine can be selected from the group consisting of hydrazine, ethylenediamine, propylenediamine, butylenediamine, m-phenylenediamine, mixed m, p-xylenediamine, piperazine, propylamine, butylamine, aniline, benzylamine, diethylenetriamine, triethylenetetramine, tetraethylenepentamine, and polyethyleneimine.

The caustic-treated coal preferably is generated by: (i) treatment of native coal with fused alkali metal caustic followed by (ii) at least one water wash and at least one acid wash to yield caustic-treated coal having sulfur and mineral content lower than the native coal and meeting EPA New Source Performance Standards. Reducing the sulfur content of the coal results in lower sulfur emissions when the contaminant-containing coal is burned. The acid wash can comprise a wash with carbonic acid, or a wash with a strong acid such as sulfuric acid.

The contacting and combusting steps can be performed at different times or locations. When the combusting step is performed apart from the contacting step, a combination of the caustic-treated coal, water, and slagging agent is provided, the combination is combusted, and the slag is disposed of as a non-hazardous waste.

Variations of the process are available for acidic feed water and feed water containing substantial quantities of metal ions precipitated at alkaline pH as hydroxides, generally referred to as "heavy metals." When treating acidic water, the caustic-treated coal used contains sufficient residual caustic from the caustic treatment to substantially neutralize the acidity of the water. For water having a high heavy metal content, a pre-precipitation step to precipitate ions of heavy metals as hydroxides is used. In the pre-precipitation step, the feed water is contacted with alkali to raise the pH of the feed water to a pH in the range of from about 8 to about 10. The precipitated hydroxides are then removed.

The present invention also includes several integrated disposal methods for decontamination of aqueous wastes. The first of these methods comprises:

(1) contacting a feed water with alkali as described above;

(2) providing a caustic-treated coal as described above;

(3) contacting the caustic-treated coal with the pH-raised feed water, as in the general method described above;

(4) removing at least a portion of the water that has been reduced in contaminant so that a coal-water slurry remains, the slurry containing coal and water at a water to coal mass ratio lower than the water to coal mass ratio of step (3), the quantity of coal in the coal-water slurry being sufficient to support combustion;

(5) adding a slagging agent to the coal-water slurry as described above; and (6) combusting a combination of the slagging agent and the coal-water slurry, producing heat.

In this method, the heat produced can be used to generate steam, and the steam can then be used to generate electric power or injected into the aquifer to promote removal of metal ion and organic contaminants.

A second integrated disposal method is similar, except that the caustic-treated coal is contacted with the pH-raised feed water in the presence of a slagging agent.

In another version of the general method, the caustic-treated coal can be used in conjunction with activated charcoal to remove contaminants with still greater efficiency. The treatment with activated charcoal can be applied after the treatment with coal, or the water can be treated by using a mixed bed of coal and activated charcoal.

DRAWINGS

These and other features, aspects, and advantages of the present invention will become better understood with reference to the following description, appended claims, and the accompanying drawings where:

FIG. 3 shows a sorption isotherm of nickel on caustic-treated coal;

DESCRIPTION

Definitions

Figure 1:
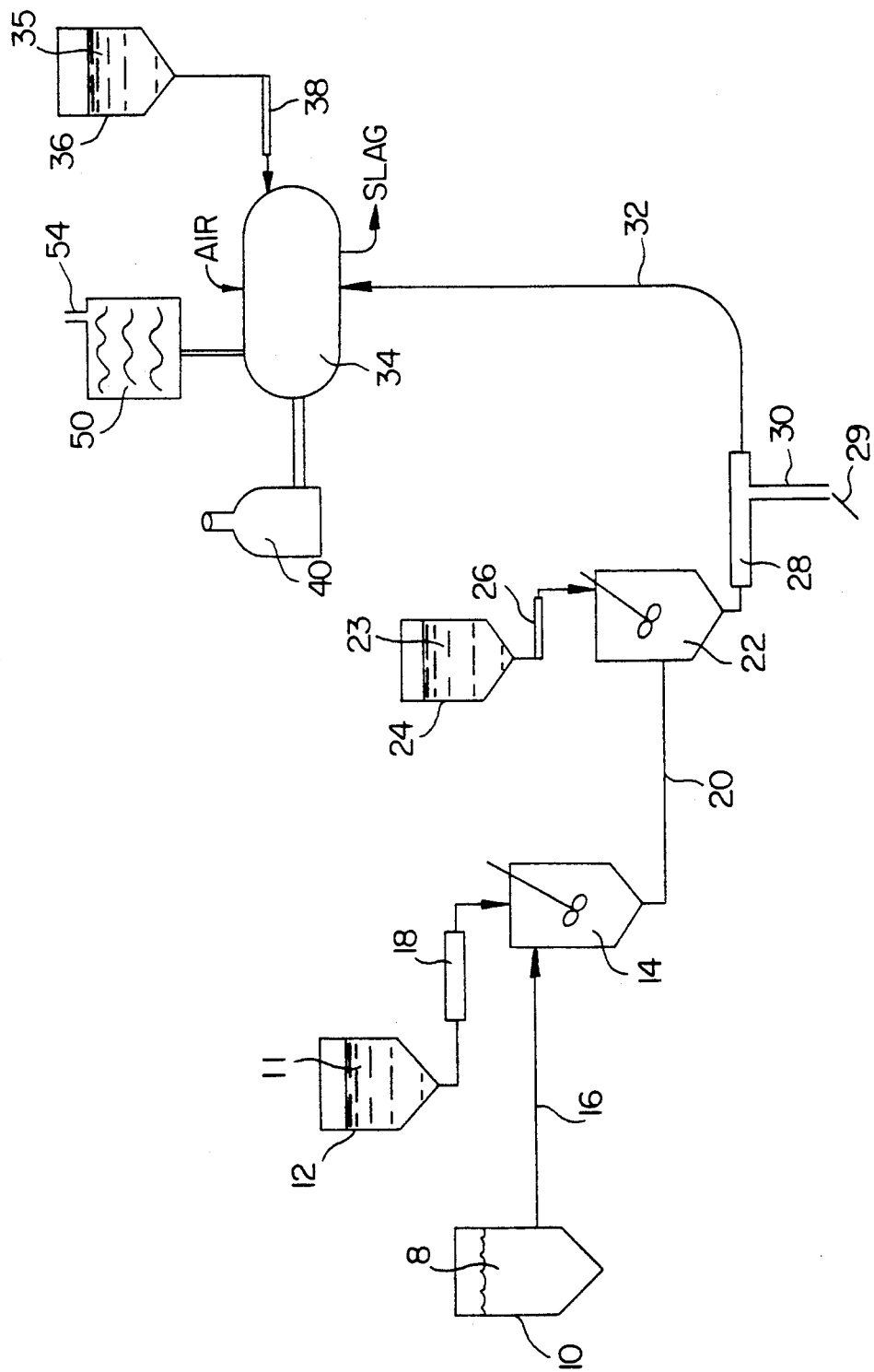
FIG. 1 is a schematic diagram of a waste disposal process according to the present invention suitable for the detoxification and disposal of aqueous hazardous wastes.

In the context of this disclosure, the following terms are defined as follows unless otherwise indicated:

Self-combustible: Coal is self-combustible when it can undergo ignition then sustain combustion at a rate releasing heat in the presence of an oxidizing agent alone without the required presence of another fuel component that promotes combustion of the coal. Self-combustible coal is distinguished from other carbonaceous materials, such as activated charcoal, by the presence of a sufficient quantity of hydrogen to be capable of ignition as described above.

Native coal: Coal that has not undergone any treatment other than mechanical treatment such as grinding or sizing subsequent to its original mining.

Heavy metal: A metal with a molecular weight greater than the molecular weight of sodium, with the exception of magnesium, aluminum, potassium, and calcium. Ions of heavy metals precipitate as hydroxides at pH 8-10.

Organic compound: A carbon-containing compound having at least one carbon-carbon or carbon-hydrogen bond, including aliphatic, alicyclic, aromatic, and heterocyclic compounds and compounds derived from any of these by substitution with halogens, boron, nitrogen, phosphorus, sulfur, selenium, tellurium, and/or metals in covalent or coordinate-covalent linkage.

Aromatic compound: Any organic compound possessing at least one five- or six-membered ring with aromaticity, including compounds substituted with halogen, sulfur, nitrogen, and/or phosphorus.

Caustic: For the purposes of this application, the term "caustic" includes both alkali metal caustic (NaOH, KOH, and mixtures thereof) and $CaOH_2$. The term "alkali metal caustic" includes NaOH, KOH, and other highly alkaline compounds derived from metals of Group I of the periodic table.

I. INTRODUCTION: THE BASIS OF THE PROCESS

A process of decontamination and detoxification of liquid wastes is based on the discovery that ordinary coal treated with caustic is rendered sufficiently surface-active that it can combine with significant quantities of heavy metal ionic contaminants as well as organic contaminants while remaining self-combustible. The process by which contaminants combine with the coal to yield contaminant-containing coal is referred to generally herein as "sorption." The combination of contaminant with the coal reduces the contaminant content of the water by at least about 80% by weight.

After the coal combines with contaminants to generate contaminant-containing coal, water that has been reduced in contaminant content can be removed from the coal. The contaminant-containing coal can then be burned, typically in the presence of a slagging agent in a slagging coal combustor, so that any organic contaminant is incinerated by combustion and any metal ion contaminant is encapsulated permanently and harmlessly in the slag. The slag can then be disposed of safely as a nonhazardous waste, such as by burying in a landfill. The net result of this process is to reduce the volume of waste required for disposal by more than 99%.

II. THE TREATED COAL

The coal that is used for this process is native coal treated so that it becomes substantially hydrophilic while remaining self-combusting. In addition, the treated coal used for this process has a reduced volatile content when compared to natural coal, and a surface porosity sufficient to allow it to sorb organics and metal ions. Typically, the coal has undergone treatment with fused alkali metal caustic (sodium or potassium hydroxide).

A. Properties of Coal Suitable for Use in a Process According to the Present Invention 1. Self-Combustibility Coal suitable for a process according to the present invention has self-combustibility substantially equivalent to that of untreated native coal. In other words, the treated coal has sufficient hydrogen present to be capable of ignition and supports combustion without the addition of accelerants or other compounds. Contaminant-containing coal remains suitable for self-supporting combustion for disposing of the contaminant. This distinguishes coal useful in a process according to the present invention from activated charcoal, which has been oxidized, possesses little hydrogen, and is difficult to ignite.

2. Hydrophilicity

Coal suitable for a process according to the present invention is substantially hydrophilic so that it can sorb ionic species such as metal ions. Untreated coal is hydrophobic and thus has little sorption capacity for ionic species.

3. Reduced Volatile Content

Untreated coal has a significant content of volatiles that can be released into water which the coal was being used to detoxify, defeating the purpose of the treatment. Accordingly, coal used in the present invention has a reduced volatile content such that substantially no volatile components are leached from the coal into an aqueous sample when the coal is used to treat such a sample. Typically, the volatile content of treated coal is reduced by about 40% to 50%.

4. Porosity

Coal suitable for a process according to the present invention has a surface area of about 250–500 m$^3$/g as measured by the standard BET apparatus employed by the United States Department of Energy.

5. Size

The size of the coal used is noncritical. Any size of coal that is mechanically compatible with the elements of the system can be used.

B. Use of Coal Treated with Fused Caustic

Preferably, the coal is native coal first treated with caustic. Most preferably, the caustic is fused alkali metal caustic (sodium or potassium hydroxide or a mixture thereof). However, aqueous caustic can also be used. As an alternative to alkali metal caustic, the coal can be treated with Ca(OH)$_2$.

Several processes for treating coal that produce coal suitable for use in a process according to the present invention have been described in: (1) U.S. Pat. application No. 07/419,659, by R.A. Meyers et al., filed on Oct. 11, 1989, and entitled "Process for Upgrading Coal," and (2) U.S. Pat. application No. 07/452,794, by R.A. Meyers et al., filed on Dec. 19, 1989, and entitled "Process for Upgrading Coal." Both of these patent applications are incorporated herein, in their entirety, by this reference. Coal produced by either of these processes is referred to herein as Gravimelt coal. In general, the Gravimelt process involves treatment of native coal with fused alkali metal caustic followed by at least one water wash and at least one acid wash to yield caustic-treated coal having substantially lower sulfur and mineral content than the native coal.

One version of the Gravimelt process, described in more detail in U.S. Pat. application Ser. No. 07/452,794, employs a water wash of the coal treated with fused alkali metal caustic, the temperature of the water wash being no higher than about 200° F. and the residence time of the coal in the water wash being no greater than 2 hours. The coal is then treated with acid, preferably a strong mineral acid such as sulfuric acid, to remove additional mineral matter from the coal.

A second version of the Gravimelt process, described in more detail in U.S. Pat. application Ser. No. 07/419,659, employs in succession: (1) a water wash; (2) a wash with carbonic acid; and (3) a wash with an acid stronger than carbonic acid, preferably a strong mineral acid such as sulfuric acid, to treat the coal that was first treated with fused caustic.

Coal treated by either of these processes is typically washed with sufficient water to stabilize its pH before use of the coal in a waste disposal process according to the present invention. Alternatively, the coal can be used without the final water-wash step to treat highly alkaline waste.

Coal prepared by either of these processes has a surface that is more oxidized than the surface of native coal so that it has a greater capacity to sorb metal ions than does native coal. This coal is also substantially lower in sulfur and ash than is native coal so that it can be burned without polluting the environment even after sorbing contaminants; it meets the EPA New Source Performance Standards. The coal also has reduced volatile content so that it does not release a significant quantity of volatile substances into the water treated with the coal.

In an alternative process for preparing the caustic-treated coal, the coal can be treated with fused caustic and then washed in such a manner, as with a limited quantity of water, that the caustic-treated coal retains sufficient caustic before its contact with the water from which contaminant is to be removed to substantially neutralize any acid present in the water. This may be desirable if highly acid wastes are to be treated.

C. Modification of the Coal Surface to Improve Its Sorption

Coal treated with either of the above processes still has predominantly —CH$_x$, groups on its surface (see Example 13). The —CH$_x$ groups consititute at least about 80% of the total groups on the coal surface. These groups are believed not to contribute significantly to the surface activity of the coal or its ability to sorb contaminants such as metal ions. Thus, treatments that can substitute or oxidize the —CH$_x$, groups on the surface of the coal are believed useful to increase its capacity for sorption. These treatments are applied prior to contacting the coal with the contaminated water, and are preferably applied after treatment of the coal with caustic.

Such a treatment can comprise controlled oxidation in order to introduce groups such as hydroxyl groups, aldehyde or keto groups, or carboxyl groups on the surface of the coal. Such groups are more polar and are capable of sorbing metal ions and other electrophilic substances.

In addition, the caustic-treated coal can be treated with at least one water-soluble primary or secondary amine and carbon disulfide in the presence of water to form dithiocarbamic acid salts and their derivatives as described for activated carbon in U.S. Pat. No. 4,305,827 to Sasaki, the disclosure of which is incorporated herein by this reference. Examples of such water-soluble amines include, but are not limited to, hydrazine, ethylenediamine, propylenediamine, butylenediamine, m-phenylenediamine, mixed m- and p-xylenediamine, piperazine, propylamine, butylamine, aniline, benzylamine, diethylenetriamine, triethylenetetramine, tetraethylenepentamine, and polyethyleneimine. The formation of such dithiocarbamic acid salts and dithiocarbamic acid derivatives is believed to increase the heavy metal ion sorption capacity and specificity of the coal. By proper treatment of the coal to add selected metal ion sorbing functional groups, it is believed that the coal's specificity and capacity for the type of heavy metals found in the particular waste water being treated can be increased.

III. THE SORPTION PROCESS

A. Species Sorbed

The present invention is capable of removing both metal ions and organics by sorption from contaminated water. The water contacted with the coal and containing contaminants is referred to generally herein as "feed water." Among the ionic species sorbed are ions of Hg, Cd, Ni, Mg, Ca, Cu, Sr, Ag, Fe, Zn, and As. Of these ions, Hg, Cd, Ni, Cu, Sr, Ag, Fe, and Zn are considered ions of heavy metals and can be deleterious to human and animal health when present in quantities greater than trace. Arsenic, a non-metal, is extremely toxic.

For organics, most aliphatic, alicyclic, and aromatic compounds are believed to be sorbed to a substantial extent, especially aromatic compounds, including benzene, toluene, and their derivatives, including halogenated aromatics and other substituted aromatics. Polycyclic aromatics are believed to be effectively sorbed.

B. Parameters of the Sorption Process

The sorption process is typically carried out by providing coal prepared as described above and contacting the coal with an aqueous material containing at least one contaminant selected from the group consisting of organic contaminants and metal ion contaminants; multiple contaminants can be present without affecting the efficacy of the process. The coal can be contacted with the aqueous material in either a batch or a continuous procedure. In a continuous procedure, the aqueous material is percolated slowly through a bed of treated coal. The bed can be a fluidized bed and can be arranged so as to contact the stream of aqueous material in a co-current or countercurrent arrangement.

The time of contacting is typically from about 10 minutes to about 24 hours, preferably from about 30 minutes to about 10 hours, and most preferably at least one hour.

The temperature of contacting is generally non-critical and can be from about 0° C. to about 50° C.; it is typically ambient temperature and is preferably at least 10° C. The pressure is also not critical and is typically atmospheric.

The pH of contacting can be different in different contacting schemes and is discussed below.

The ratio of coal to aqueous material used varies with the contaminant level of the aqueous material and is typically from about 0.005% to about 2% by mass, i.e., a water to coal mass ratio of from about 50:1 to about 20,000:1. For total contaminant levels of about 5 ppm, a ratio of about 0.1% coal to water on a mass-to-mass basis is sufficient, i.e., a water to coal mass ratio of about 1000:1. This ratio can be increased if contaminants are present at a higher level, as might be found in acid pits or oilfield residues.

Contacting the caustic-treated coal with the contaminant-containing water generates contaminant-containing coal to be disposed of as described below in Section IV, "The Disposal Process." The contaminant-containing coal is suitable for self-supporting combustion for disposing of the contaminant.

The contacting reduces the content of contaminant in the water by at least 80% by weight, preferably by at least 90%, and most preferably at least 95%.

As a flocculation aid and final polisher, the water can be treated with alum/ferric ion in a step subsequent to treatment with caustic-treated coal. The use of an alum/ferric ion combination for final cleanup is well known in the water purification art.

Subsequent to the contacting step, the water that has been reduced in contaminant content can be removed from the coal, such as by filtration or centrifugation.

C. Adjustment of pH

Typically, the pH of the aqueous material is adjusted with concentrated alkali, such as sodium carbonate, sodium hydroxide, or slaked lime, so that it is raised to a value of about 7 to about 9 before contacting with the coal. In an alternative procedure, the pH of the aqueous material can be raised to a slightly higher range, from about 8 to about 10. The somewhat higher pH causes ions of heavy metals present in the water to form hydroxides and precipitate. The precipitated hydroxides can then be removed from the aqueous material by centrifugation or filtration prior to the contacting of the aqueous material with the coal or allowed to contact the coal which would act as a filter and a final polished for the water. The latter approach permits the disposal of the heavy metals via combustion and encapsulation.

As discussed above, in another alternative, sufficient alkali can be left in the coal from the original caustic treatment so that the coal retains sufficient caustic prior to its contact with the water to substantially neutralize the acidity of the water. This alternative is particularly desirable when highly acid waste is being treated, as the acid in the waste is neutralized by the alkali associated with coal.

D. Use of Caustic-Treated Coal in Conjunction with Activated Charcoal

In an additional alternative, caustic-treated coal can be used in conjunction with activated charcoal for more efficient cleanup. The activated charcoal used is one capable of sorbing the contaminant. The water can be contacted with the activated charcoal subsequent to the step of contacting with caustic-treated coal, in order to remove additional contaminant; as an alternative, the water can be contacted with a mixed bed of caustic-treated coal and charcoal in a single-step reaction. In the mixed bed, the caustic-treated coal and charcoal can be compartmentalized so that the coal can be removed for combustion.

IV. THE DISPOSAL PROCESS

A. Combustion With Slagging Agent

The coal combined with the contaminants is then combusted, typically in the presence of a slagging agent that can encapsulate metal ion contaminants as well as ash resulting from the combustion of the coal. The slagging agent is typically a glass-forming material such as sodium or potassium silicate or aluminosilicate. The slagging agent is present in a quantity sufficient to encapsulate any metal contaminant combined with the coal. The weight ratio of coal to slagging agent is from about 99:1 to about 9:1, preferably from about 19:1 to about 9:1. The preferred ratio varies with the combustor used and with the coal type; for low ash coal, the ratio is most preferably about 19:1, and for higher ash coal, the ratio is preferably most preferably about 9:1. The ratio of coal to water employed as fuel can be any ratio of coal to water that supports combustion; typically, a 1:1 ratio of coal:water, plus slagging agent, is utilized as fuel in the combustion step.

The combustion of the coal in the presence of the slagging agent can occur in a slagging coal combustor, such as those described in the following patents, all of which are incorporated herein by this reference: (1) U.S. Pat. No. 4,217,132 to Burge et al., issued Aug. 12, 1980, and entitled "Method and Apparatus for In-Flight Combustion of Carbonaceous Fuels"; (2) U.S. Pat. No. 4,556,443 to Burge et al., issued May 6, 1986, and entitled "Method and Apparatus for In-Flight Combustion of Carbonaceous Fuels"; (3) U.S. Pat. No. 4,660,478 to Sheppard et al., issued Apr. 28, 1987, and entitled "Slagging Combustor with Externally-Hot Fuel Injector"; (4) U.S. Pat. No. 4,685,404 to Sheppard et al., issued Aug. 11, 1987 and entitled "Slagging Combustion System;" and (5) U.S. Pat. No. 4,920,898 to Solbes et al., issued May 1, 1990 and entitled "Gas Turbine Slagging Combustion System."

Briefly, slagging combustors such as those described in the above-identified patent applications provide a high velocity, rotational-flow combustion zone such that the coal is burned substoichiometrically, and means for removing mineral matter as liquid slag from the combustion chamber of the slagging agent.

The contacting and burning steps can be performed at different times and/or locations. For example, small quantities of waste combined with coal can be collected from a number of locations for burning at a central site.

B. Disposal of Slagged Residue

The residue incorporated in the slag can be disposed as a non-hazardous waste in a landfill or other disposal site. It can be incorporated into paving material or railroad ballast. The heavy metal residues are safely encapsulated in the slag and do not leach out.

C. Disposal of Gaseous Residue

The combustion process generates mostly carbon dioxide and water vapor, which can be vented to the atmosphere. A certain amount of acid, such as hydrochloric acid, may be produced by the combustion process. Such acids can be trapped by running the exhaust from the combustion to a baghouse equipped with a scrubber or other suitable trapping device to remove acid from the products of combustion.

V. INTEGRATED DECONTAMINATION SCHEMES

The sorption and combustion processes of the present invention can be incorporated into several integrated decontamination schemes. These schemes are suitable for the decontamination and disposal of hazardous waste or for the in situ purification of contaminated ground water, with the purified ground water being returned to the site.

A. Disposal-Oriented Decontamination Scheme

A scheme for the decontamination of a contaminant from water, such as aqueous hazardous waste, is depicted in FIG. 1. This scheme is disposal-oriented in that its emphasis is on the generation of a coal-water slurry for subsequent burning in the presence of a slagging agent, only enough water being removed to ensure that the slurry is capable of combustion.

With reference to FIG. 1, the contaminated aqueous waste 8 is collected for treatment in a holding tank 10. Concentrated alkali (e.g., sodium carbonate, sodium hydroxide, or slaked lime) 11 for pH adjustment is stored in a concentrated alkali container 12. The waste enters a first mixing tank 14 through a first connecting line 16. The concentrated alkali 11 enters the mixing tank 14 by means of a first conveyor 18. In the mixing tank 14, the concentrated alkali 11 is mixed with the waste 8 to adjust the pH to the optimal value for the subsequent contacting step. The mixture of waste 8 and concentrated alkali 11 then moves through a second connecting line 20 to a second mixing tank 22. Caustic-treated coal 23 then is transported from a coal container 24 into the second mixing tank 22 by means of a second conveyor 26. In the second mixing tank 22 a coal-water slurry is generated. Contaminants in the waste 8 are sorbed onto the coal 23; the residence time in the second mixing tank 22 is sufficiently long that at least 80% of the contaminants in the waste 8 are sorbed onto the coal 23.

The slurry is sent through a water filter 28 and decontaminated water 29 withdrawn through an outlet line 30; the remaining slurry is sent through a slurry line 32 into a slagging coal combustor 34. Slagging agent 35, such as sodium or potassium silicate, in a slagging agent container 36 is transported by means of a third conveyor 38 into the slagging coal combustor 34. The combination of the coal-water slurry and slagging agent 35 is burned in the slagging coal combustor 34. Heat from the slagging coal combustor 34 is directed to a steam generator 40 where it is used to produce steam that can be used for power generation or secondary recovery. The slag from the slagging coal combustor 34 is disposed of by burying in landfills as a non-hazardous waste or used for roads or other construction material, with any metal ion contaminants encapsulated. The gaseous products of the combustion are sent to a baghouse 50 to filter out acidic gases, then vented to the air through a vent 54.

B. Scheme for In Situ Decontamination of Ground Water

Figure 2:
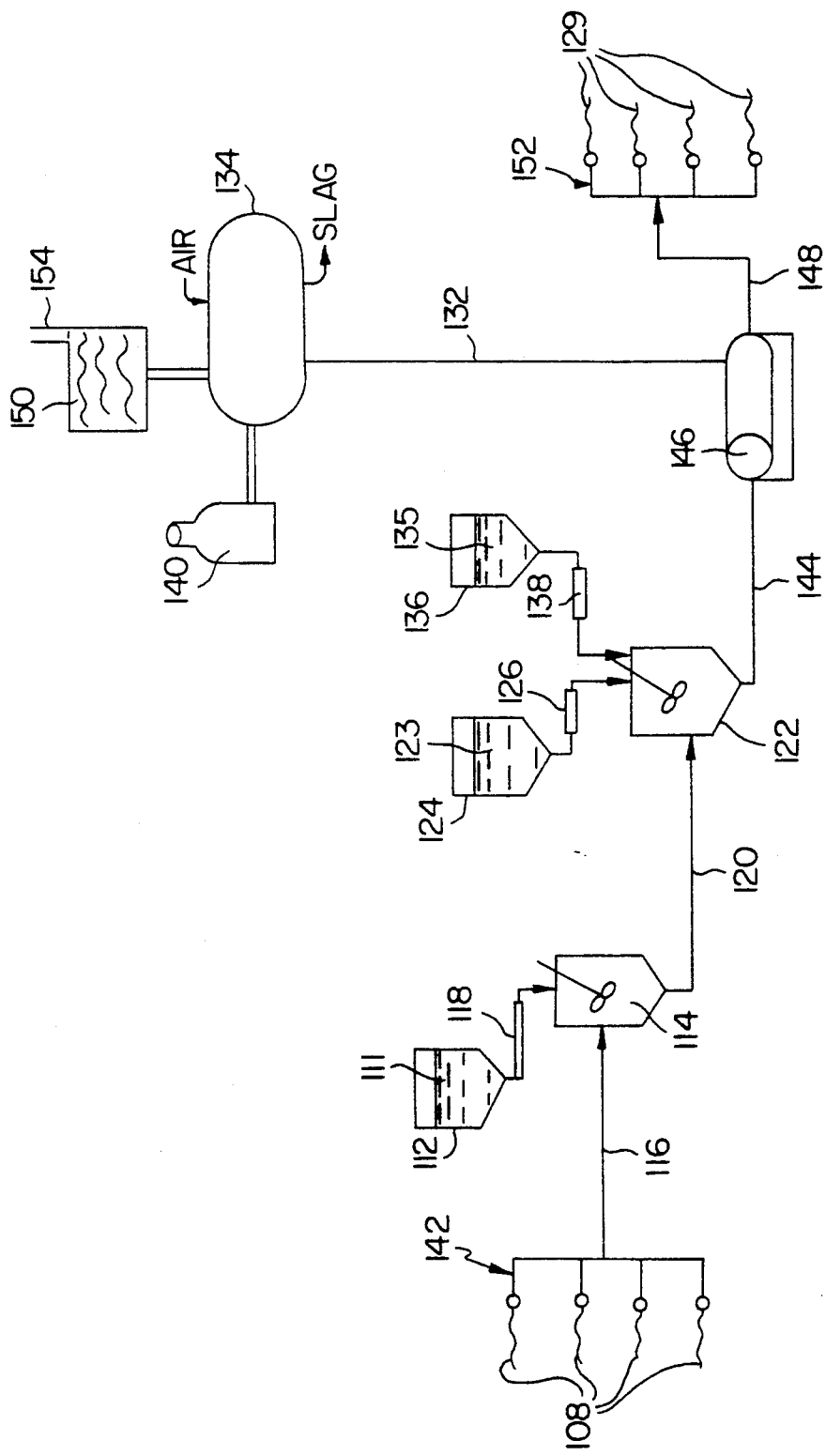
FIG. 2 is a schematic diagram of an alternative waste disposal process according to the present invention suitable for the in situ detoxification of aqueous hazardous waste such as contaminated groundwater, with discharge of the decontaminated water back into the site.

A scheme for the in situ decontamination of ground water is depicted in FIG. 2.

With reference to FIG. 2, contaminated ground water 108 to be purified flows into an intercept well system 142 and then enters a first mixing tank 114 through a first connecting line 116. Concentrated alkali 111 for pH adjustment is stored in a concentrated alkali container 112; the concentrated alkali 111 enters the first mixing tank 114 by means of a first conveyor 118. In the first mixing tank 114, the concentrated alkali 111 is mixed with the contaminated ground water 108 to adjust the pH to the optimal value for the subsequent contacting step. The mixture of contaminated ground water 108 and concentrated alkali 111 then moves through a second connecting line 120 to a second mixing tank 122. Caustic-treated coal 123 then is transported from a coal container 124 into the second mixing tank 122 by means of a second conveyor 126. Slagging agent 135 in a slagging agent container 136 is then transported by means of a third conveyor 138 to the second mixing tank 122. In the second mixing tank 122 a coal-water slurry containing slagging agent is generated. The slurry is sent through a slurry outlet line 144 to a centrifuge 146 where decontaminated water 129 is separated and drawn off through a water outlet line 148, then reinjected into the ground water site by means of a reinjection manifold 152. The remaining slurry, containing coal and water at approximately a 1:1 weight ratio of coal-water as well as slagging agent, is sent through a slurry line 132 into a slagging coal combustor 134. The combination of the coal-water slurry and slagging agent is burned in the slagging coal combustor 134. Heat from the slagging coal combustor 134 is directed to a steam generator 140; the slag resulting from combustion is disposed. The gaseous products of combustion are sent to a baghouse 150 to filter out acidic gases and then vented to the atmosphere through a vent 154.

A similar arrangement can be employed, omitting the intercept well system 142 and the reinjection manifold 152, when it is desired to collect waste at one site and process it at another. In this alternative arrangement, the decontaminated water 129 drawn off through the water outlet line 148 can be utilized for any desired purpose at the processing site.

For the arrangements depicted in FIGS. 1 and 2, all of the apparatus except the tanks or the intercept well and reinjection manifold of FIG. 2 can be portable and can be skid-mounted or movable on trucks or railroad cars as needed.

The invention is illustrated by the following examples. The examples are for illustrative purposes only and are not to be construed as limiting the scope of the invention in any manner.

EXAMPLES

Example 1

Sorption Capacity of MCL Coal for Methylene Blue at pH 2.8 and pH 7.3

A methylene blue method was used to evaluate the sorption capabilities of various sorbents, namely: (1) unprocessed coal; (2) alkali metal caustic-treated coal prepared by the Gravimelt process (treatment with fused alkali metal caustic and subsequent acid washing), referred to as Molten Caustic Leached (MCL) coal; and (3) activated charcoal (Barnaby Cheney, Lot AE9619) for large molecular weight organic molecules. All sorbents were sized to −100 mesh size so that any surface area effects would be comparable between samples. The MCL coal was previously adjusted to pH 2.8 or pH 7.3.

Weighed portions (0.15 g) of sorbent were contacted with a solution containing 1 mg/mL of methylene blue, the mixtures were shaken, and the sorbent separated by centrifugation. The step was repeated with known additions of methylene blue until the supernatant solution retained the blue color indicating that no further sorption was taking place. At this point the weight of methylene blue sorbed per unit weight of coal was calculated.

The results obtained are presented in Table 1. The MCL coal sorbed approximately one-fourth as much methylene blue per unit weight as the activated charcoal. There was little difference between sorption at pH 2.8 and sorption at pH 7.3, although sorption was slightly greater at the higher pH. In contrast, native untreated coal sorbed only about 2% as much methylene blue per unit weight as did activated charcoal and about 7% as much per unit as treated coal. Thus the treated coal sorbed about 14 times as much methylene coal per unit weight as native coal. Sorption was slightly greater at pH 7.3 than at pH 2.8 for MCL coal.

TABLE 1

SORPTION OF METHYLENE BLUE BY TREATED AND UNTREATED COAL

| Sample | Sorption, mg/g |
|---|---|
| Native Pittsburgh #8 Coal | 2.3 |
| MCL Coal, pH 2.8 | 29 |
| MCL Coal, pH 7.3 | 35 |
| Activated Charcoal | 132 |

Example 2

Sorption Capacity of MCL Coal for Cd at pH 2.8 and pH 7.3

The sorption of Cd by unprocessed coal, MCL coal at pH 2.8, and MCL coal at pH 7.3 was determined. Weighed fractions (0.1 g) of unprocessed Pittsburgh #8 coal, MCL coal at pH 2.8, and MCL coal at pH 7.3, as used in Example 1, were contacted with solutions (10 mL) containing 1 ppm, 10 ppm, and 100 ppm of Cd. The mixtures were contained in capped plastic test tubes and placed on a shaker table for one hour. At the end of one hour, the liquid was filtered and analyzed for pH and Cd content.

The results are summarized in Table 2. As can be seen, the MCL coal at pH 7.3 was able to sorb nearly all the Cd at 10 ppm, while the MCL coal at pH 2.8 only sorbed efficiently at 1 ppm. Untreated Pittsburgh #8 coal did not sorb any of the Cd.

TABLE 2

SORPTION OF VARIOUS CONCENTRATIONS OF CADMIUM BY TREATED AND UNTREATED COAL

| | Final Cd Concentration, ppm, from Starting Concentration of: | | |
|---|---|---|---|
| Sample | 1.0 ppm | 10 ppm | 100 ppm |
| Native Pittsburgh #8 Coal | 1.0 (3.96) | 9.9 (2.37) | 104 (1.63) |
| MCL Coal, pH 2.8 | 0.1 (3.32) | 8.8 (2.35) | 101 (1.55) |
| MCL Coal, pH 7.3 | 0.0 (6.47) | 0.39 (3.70) | 102 (1.51) | pH of the final solution is in parenthesis.

Example 3

Comparison of Sorption of Ni by MCL Coal and Native Pittsburgh Coal at pH 7

The MCL coal and native Pittsburgh #8 coal used were the same as in Examples 1 and 2. The pH of the MCL coal and native coal was adjusted to pH 7 using 0.1 N NaOH. All solutions used in this example were adjusted to pH ~7 using dilute NaOH or $H_2SO_4$. The sorption of Ni was analyzed using the batch technique of Examples 1 and 2. Standard solutions of Ni were analyzed before the inception of the experiment and then concurrently with the filtered samples to correct for any instability of the Ni that would result in precipitation of the ion during the incubation period of the experiment.

The results of Ni sorption by MCL coal and native Pittsburgh #8 coal are shown in Tables 3A and 3B, respectively. The MCL coal was clearly superior to the native Pittsburgh #8 which had essentially no sorption capacity.

TABLE 3

COMPARISON OF SORPTION OF NICKEL BY MCL COAL AND UNTREATED COAL AT pH 7

| Sample Nos. | pH Starting | pH Final | Ni Concentration, mg/L Starting | Ni Concentration, mg/L Final | Ni Sorp. meq/g |
|---|---|---|---|---|---|
| A. MCL COAL | | | | | |
| 1A, 1B | 7.4, 7.4 | 7.3, 7.3 | 0.89, 0.89 | <0.02, <0.02 | 0.003, 0.003 |
| 2A, 2B | 6.0, 6.0 | 6.6, 6.6 | 10.6, 10.6 | <0.02, <0.02 | 0.033, 0.033 |
| 3A, 3B | 7.4, 7.4 | 5.0, 4.9 | 102, 102 | 25.6, 31.6 | 0.24, 0.22 |
| B. UNTREATED PITTSBURGH NO. 8 COAL | | | | | |
| 1A, 1B | 7.4, 7.4 | 4.8, 4.8 | 0.89, 0.89 | 0.66, 0.66 | 0.0006, 0.0006 |
| 2A, 2B | 6.0, 6.0 | 5.1, 4.6 | 10.6, 10.6 | 10.7, 10.6 | 0.0 |
| 3A, 3B | 7.4, 7.4 | 4.9, 4.8 | 102, 102 | 109, 110 | 0.0 |

A nickel sorption isotherm was developed using the batch experimental technique for analyzing sorption, as used in Examples 1-2, and solutions of higher nickel content. The results of the nickel isotherm experiments are tabulated in Table 4 and shown graphically in FIG. 3. The total mass of Ni sorbed on MCL coal was 6.76 mg/g.

TABLE 4

Ni SORPTION ISOTHERM FOR NEUTRALIZED MCL COAL

| Ni Uptake, meq/g | Equilibrium Concentration, mg/L |
|---|---|
| 0.073 | <0.1 |
| 0.16 | 1.3 |
| 0.25 | 8.9 |
| 0.29 | 32.4 |
| 0.29 | 82.7 |

Example 4

Effect of NaCl on Sorption of Ni by MCL Coal

Nickel solutions at 50 and 100 ppb were prepared in deionized water; nickel solutions at 1, 10, and 100 ppm, as well as at 50 and 100 ppb were prepared in deionized water spiked with 400 ppm of NaCl. Nickel sorption experiments using MCL coal neutralized to pH ~7 were performed as in Example 3. The results of the experiments are summarized in Table 5. The MCL coal neutralized to pH ~7 was found to be capable of removing Ni from either deionized water or deionized water spiked with NaCl. Final Ni concentration levels of <5 to 15 ppb were found when the starting concentration levels were 1 ppm or less. The addition of NaCl did not affect the sorption of Ni by MCL coal, indicating that the process of the present invention can be successfully applied to hazardous wastes containing significant concentrations of Na ions.

TABLE 5

EFFECT OF NaCl ON SORPTION OF NICKEL BY MCL COAL AT pH 7

| Sample Nos. | pH Starting | pH Final | Ni Concentration, mg/L Starting | Ni Concentration, mg/L Final |
|---|---|---|---|---|
| A. NO NaCl PRESENT | | | | |
| 1A, 1B | 5.3, 5.3 | 7.0, 7.1 | 0.050, 0.050 | 0.0070, 0.013 |
| 2A, 2B | 4.4, 4.4 | 7.0, 7.0 | 0.100, 0.100 | 0.0062, 0.0065 |
| B. 400 mg/L NaCl PRESENT | | | | |
| 1A, 1B | 6.0, 6.0 | 6.6, 6.6 | 1, 1 | 0.0060, 0.012 |
| 2A, 2B | 7.3, 7.3 | 6.5, 6.4 | 10, 10 | 0.021, 0.062 |
| 3A, 3B | 6.3, 6.3 | 5.0, 5.1 | 100, 100 | 33, 31 |
| 4A, 4B | 6.0, 6.0 | 6.4, 6.4 | <0.005, <0.005 | <0.005, <0.005 |
| 5A, 5B | 6.0, 6.0 | 6.4, 6.4 | 0.042, 0.042 | <0.005, <0.005 |
| 6A, 6B | 6.0, 6.0 | 6.4, 6.4 | 0.075, 0.075 | <0.005, <0.005 |

Example 5

Determination of pH Changes and Possible Introduction of Ions When Water is Contacted by MCL Coal Dry neutralized and unneutralized MCL coal samples were contacted with the deionized water for 24 hours. The solutions that were contacted with the coal were analyzed by inductively coupled plasma-mass spectroscopy (ICP-MS) to determine whether any ions were introduced by the coal, thus potentially interfering with the use of the coal to remove metal ion contaminants form the feed water. ICP-MS is an analytical technique in which sample solutions are aspirated into an argon plasma torch at about 12,000° K where the surrounding matrix is volatilized and broken down. Molecules are atomized and ionized. The torch output is then directed at a controlled vacuum leak of a mass spectrometer. The mass spectrometer then measures the distribution and intensity of the ions. Concentration is proportional to the signal produced. The ICP-MS was calibrated with a single concentration multielement standard. The results are presented in Table 6. The coal does not introduce a significant concentration of impurity metal ions into water contacted with it.

TABLE 6

INTRODUCTION OF IONS WHEN WATER IS CONTACTED WITH MCL COAL

| Sample | Concentration of Ion, mg/L | | | | |
|---|---|---|---|---|---|
| | Na | Sc | Se | Fe | Hg |
| NaOH-Neutralized[a] | 0.908 | 0.023 | 0.19 | 0.475 | 0 |
| Unneutralized[b] | 1.068 | 0 | 0 | 1.74 | 0.38 |

[a]pH was 7.2, and 7.2 in deionized water.
[b]pH was 2.89 in deionized water.

Example 6

Removal of Contaminants from Capistrano Test Site (CTS) Waste Water by MCL Coal As a demonstration of the process's ability to treat complex waste streams, samples of waste water from the Capistrano Test Site (CTS) in San Juan Capistrano, California was filtered through a 0.45 μm filter and then shaken with NaOH-neutralized MCL coal prepared as in Example 2. No attempt was made to optimize the coal preparation or the test conditions other than to monitor pH. A multielement analysis was performed by ICP-MS, which was calibrated using a single concentration multielement standard. The results are shown in Table 7. There was a particularly high mercury signal in the untreated CTS waste water that was reduced after contact with NaOH-treated MCL coal. The presence of mercury in the untreated CTS waste water was verified by the cold vapor atomic absorption spectroscopy technique, in which ionic mercury is chemically reduced to elemental mercury through addition of reducing agents to the sample solution and the elemental mercury is sparged from the test solution and past a UV measuring system. The concentration of mercury in the waste water was found to be 14 ppb.

TABLE 7

CLEANUP OF CTS WASTEWATER WITH NaOH-NEUTRALIZED MCL COAL

| Analyte[a] | Concentration in CTS Water, mg/L | Concentration after Treatment, mg/L | Sorption. meq/g |
|---|---|---|---|
| Na | 2.81 | 1.19, 0 | 0.007, 0.012 |
| Mg | 0.532 | 0, 0 | 0.004, 0.004 |
| Al | 8.18 | 6.93, 8.52 | — |
| K | 30.3 | 32.3, 32.6 | — |
| Ca | 25.1 | 0, 0 | 0.125. 0.125 |
| Ti | 0.515 | 0.543, 0.592 | — |
| U | 0.0021 | 0.013, 0.014 | — |
| Ni | 0.054 | 0.037, 0.061 | — |
| Cu | 0.329 | 0, 0 | 0.001, 0.001 |
| As | 0.083 | 0.085, 0.087 | — |
| Se | 0 | 0.137, 0.045 | — |
| Sr | 0.316 | 0.017, 0.021 | — |
| Mo | 0.029 | 0.059, 0.052 | — |
| Ag | 0.369 | 0, 0 | 0.0003, 0.0003 |
| Sn | 0.011 | 0, 0 | — |
| Sb | 0.046 | 0.059, 0.056 | — |
| Cs | 0.002 | 0.001, 0.002 | — |
| Ba | 0.080 | 0, 0 | 0.0001, 0.0001 |
| Hg | 0.186 | 0.037, 0.009 | — |

[a]Analysis performed with two samples: pH of CTS wastewater was 11.4; pH of both samples after treatment was 9.8.
[b]Duplicate analyses.
[c]Where no absorption was reported either no decrease in the original concentration was seen or the lower number after response was believed to be within the normal analytical procesion of the analysis method in this matrix.

The NaOH-treated MCL coal was particularly effective in removing a number of metal ions, including Na, Mg, Ca, Cu, Sr, Ag, and Hg.

Because the initial pH of the CTS waste water was high (11.4), the waste water was also contacted with unneutralized and unwashed MCL coal. This experiment was performed in the same manner as with neutralized MCL coal. The results are presented in Table 8. Effective removal of Fe, Ni, and Cu, among other ions, was seen.

TABLE 8

CLEANUP OF CTS WASTEWATER WITH UNNEUTRALIZED MCL COAL

| Analyte[a] | Concentration in CTS Water. mg/L | Concentration after Treatment. mg/L | Sorption[b], meq/g |
|---|---|---|---|
| Na | 2.81 | 1.10 | 0.007 |
| Mg | 0.532 | 0 | 0.004 |
| Al | 8.18 | 7.77 | — |
| K | 30.3 | 37.9 | — |
| Ca | 25.1 | 0 | 0.125 |
| Ti | 0.515 | 0.614 | — |
| U | 0.0021 | 0.019 | — |
| Ni | 0.054 | 0.036 | — |
| Cu | 0.329 | 0 | 0.001 |
| As | 0.083 | 0.115 | — |
| Se | 0 | 0.46 | — |
| Sr | 0.316 | 0.041 | — |
| Mo | 0.029 | 0.069 | — |
| Ag | 0.369 | 0 | 0.0003 |
| Sn | 0.011 | 0 | — |
| Sb | 0.046 | 0.064 | — |
| Cs | 0.002 | 0.003 | — |
| Ba | 0.080 | 0 | 0.0001 |
| Hg | 0.186 | 0.027 | — |

[a]Analysis was performed with two samples, but only determination of pH and Ba concentration was done on second sample. The pH of the first sample after treatment was 9.0; of second sample, 9.1. The second sample contained no detectable Ba after treatment.
[b]Where no absorption was reported either no decrease in the original concentration was seen or the lower number after response was believed to be within the normal analytical procession of the analysis method in this matrix.

Example 8

Removal of Contaminants from Steward Mine Shaft (SMS) Waste Water Cleanup with NaOH-Neutralized MCL Coal The ability of NaOH-neutralized MCL coal to clean SMS waste water was tested in the same manner as with CTS waste water. Once again no attempt was made to optimize the coal or the contacting process. The pH of this waste water was acidic and did not change much on addition of the NaOH-neutralized MCL coal. The results are presented in Table 11. Substantial sorption was demonstrated for Mg, Fe, Ni, Cu, As, and Zn. Better removal of heavy metals could be expected if the pH was adjusted to the optimum range of 8-10.

TABLE 11

CLEANUP OF SMS WASTEWATER WITH NaOH-NEUTRALIZED MCL COAL

| Analyte[a] | Concentration in SMS Water, mg/L | Concentration[b] after Treatment, mg/L | Sorption, meq/g[c] |
|---|---|---|---|
| Na | 20.6 | 28.3, 27.3 | — |
| Mg | 159.7 | 129.5, 128.6 | 0.24, 0.26 |
| K | 29.0 | 22.1, 21.5 | — |
| Mn | 22.4 | 18.4, 18.4 | — |
| Fe | 52.0 | 21.2, 19.1 | 0.16, 0.18 |
| Co | 0.056 | 0.052, 0.045 | — |
| Ni | 0.180 | 0, 0 | 0.0006, 0.0006 |
| Cu | 0.583 | 0.39, 0 | 0.0006, 0.0006 |
| Zn | 103.7 | 65.4, 66.8 | 0.11, 0.10 |
| As | 0.090 | 0.022, 0 | — |
| Sr | 3.51 | 2.46, 2.55 | — |
| Cd | 0.148 | 0.126, 0.093 | — |
| Ba | 0.007 | 0, 0 | — |
| Hg | 0.012 | 0, 0 | — |
| Pb | 0.019 | 0.030, 0.051 | — |

[a]Analysis performed with two samples: pH of SMS wastewater was 3.4; pH of both samples after treatment was 4.0.
[b]Duplicate analysis
[c]Where no absorption was reported either no decrease in the original concentration was seen or the lower number after exposure was believed to be within the normal analytical precision of the analysis method in this matrix.

Example 9

Figure 4B:
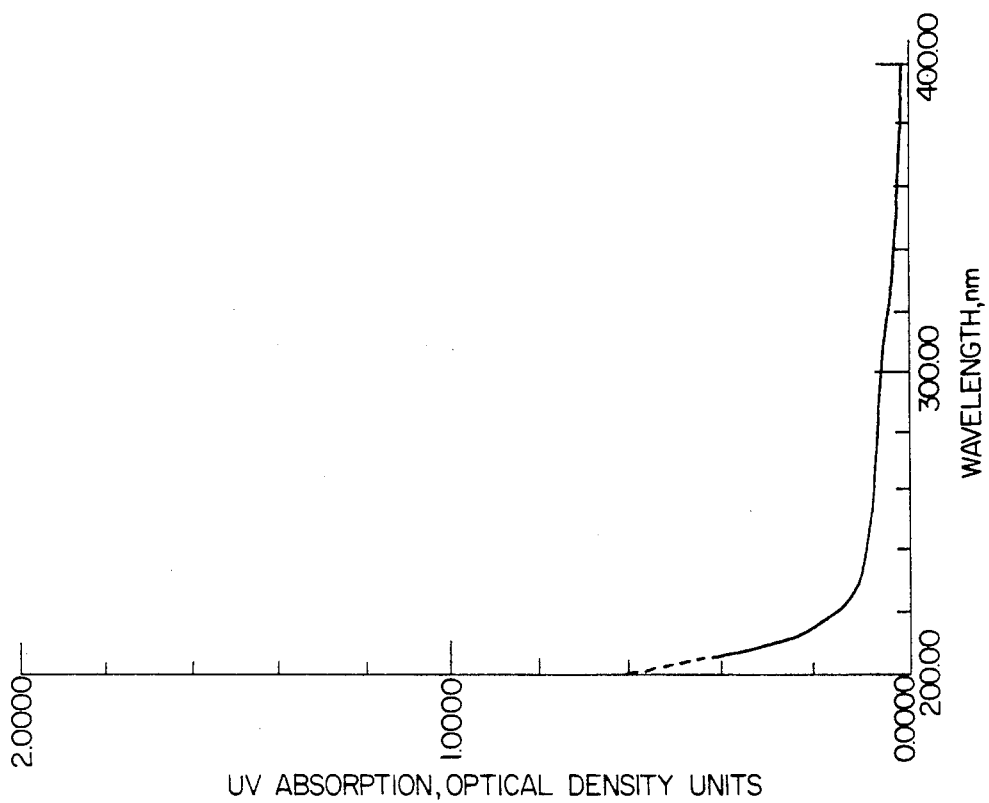
FIG. 4 shows an ultraviolet absorption scan of contaminated ground water from the Capistrano Test Site (CTS) before (FIG. 4a) and after (FIG. 4b) sorption with caustic-treated coal according to a process of the present invention, the scans indicating removal of organic contaminants.
Figure 4A:
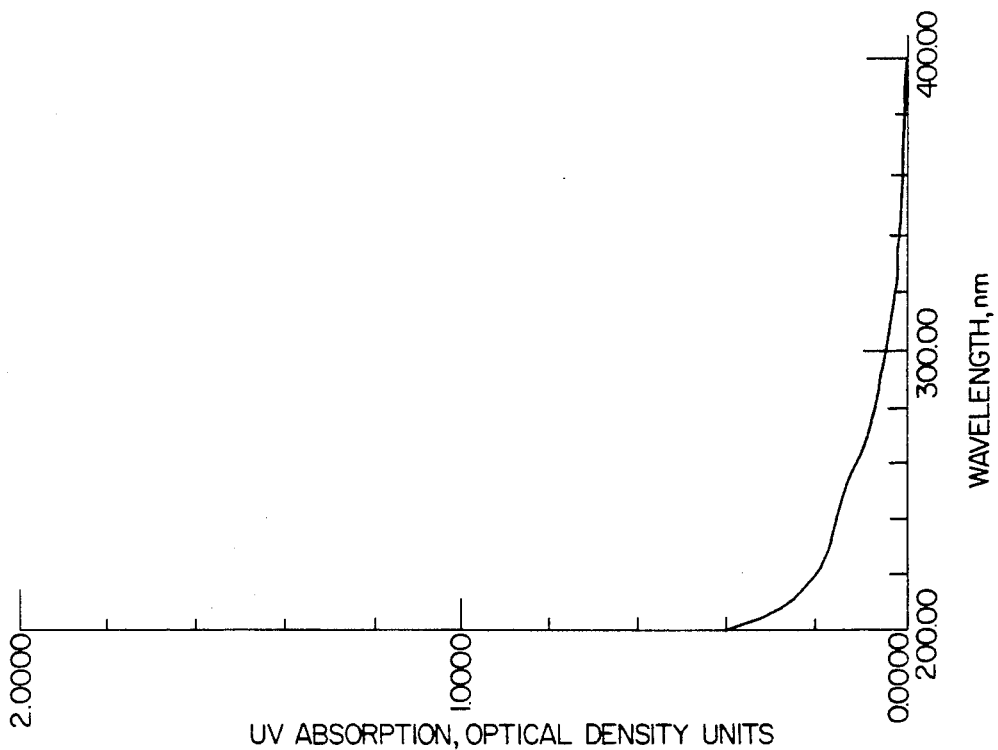

Ultraviolet Spectral Analysis of CTS Waste Water Before and After Treatment with NaOH-treated MCL Coal An ultraviolet spectrum from 200 to 400 nm was scanned on CTS wastewater before and after contacting with NaOH-neutralized MCL coal to determine the effect of treatment on the possible organics present in the waste water. The ultraviolet absorption scans are shown in FIG. 4. Some change in the direction of lower ultraviolet absorption is seen after CTS waste water is contacted with NaOH-neutralized MCL coal, indicating that organic compounds, which absorb UV radiation in this range, were removed from the wastewater by treatment with the coal.

Example 10

ESCA Analysis of Unneutralized MCL Coal

A sample of unneutralized MCL coal was surveyed by an Electron Spectroscopy for Chemical Analysis (ESCA) surface analysis to identify surface-active species. In ESCA, soft, monochromatic X-rays are directed on a sample. Inner shell electrons are ejected from the elements and collected on an electron energy analyzer. The energy of the escaping electrons is affected by the original chemical environment of the element from which they came; in particular, an electron from the same element but at a different oxidation state will exhibit a different energy. ESCA is a surface analysis method, because electrons, depending on the material, escape from only the first 2.5 to 5 nanometers of the sample.

Figure 5:
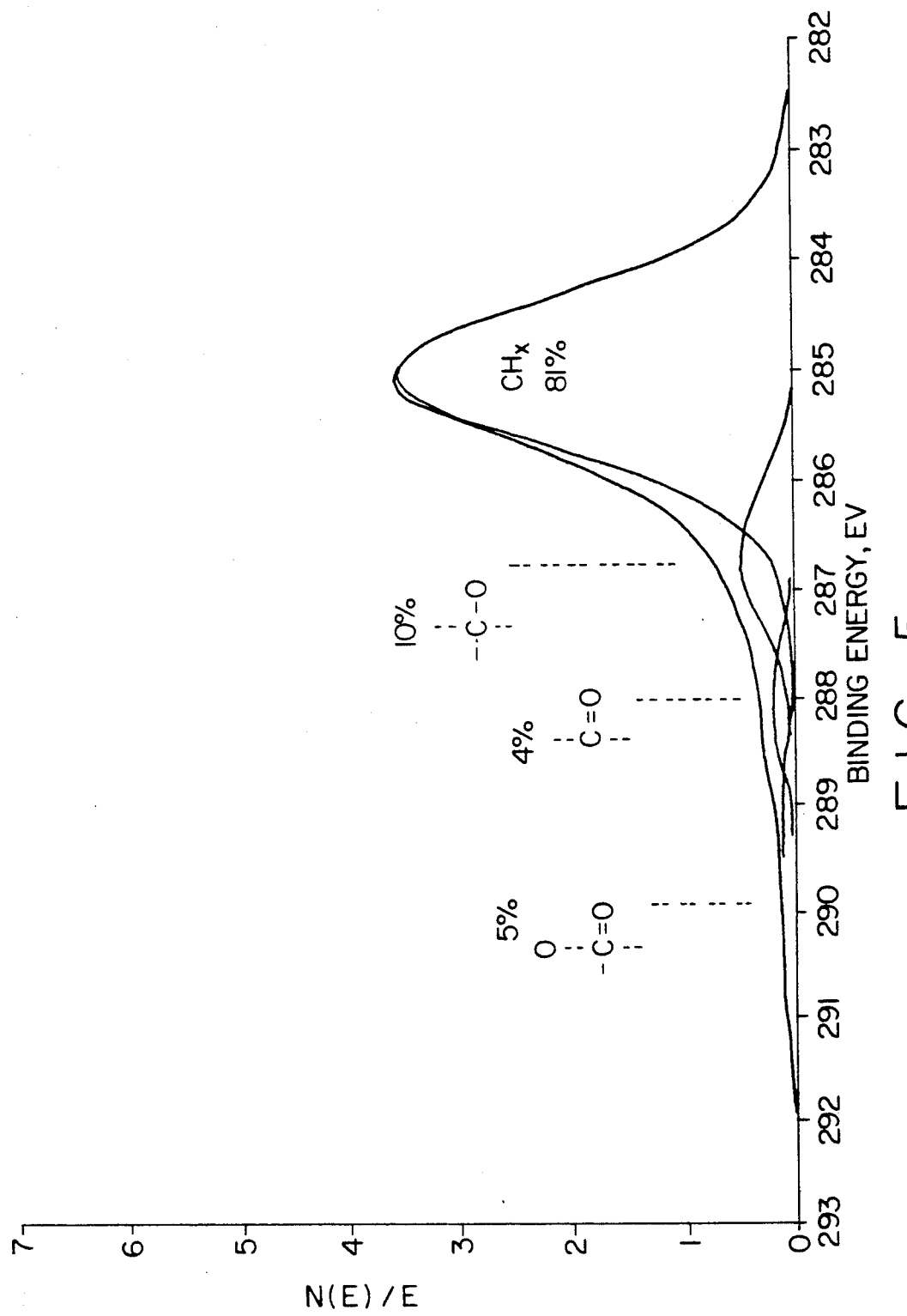
FIG. 5 shows an Electron Spectroscopy for Chemical Analysis (ESCA) analysis of caustic-treated coal neutralized to pH ~7 and suitable for a process according to the present invention, indicating that most of the groups on the coal surface oH are —$CH_x$, with only a minority of more highly oxidized groups.

The results are shown in FIG. 5. Approximately 81% of the groups are present as $CH_x$, with about 10% as C—O, 4% as C=O, and 5% as CO=O. Thus the MCL coal could be further oxidized to improve its ion-exchange capacity and the sorption of trace metals.

ADVANTAGES OF THE INVENTION

The present invention provides a rapid, efficient, and environmentally safe method of detoxification and disposal of hazardous aqueous liquid wastes. The method can dispose of both organic contaminants and metal ion contaminants, the former by combustion, and the latter by encapsulation into stable slag. It is flexible and versatile and can be operated directly at a hazardous waste site; if desired, decontaminated groundwater can be reintroduced to the site. The present invention is simple to perform and requires only inexpensive starting materials.

Although the present invention has been described in considerable detail with reference to certain preferred versions thereof, other versions are possible, i.e., use of caustic-treated coal together with activated charcoal. Therefore, the spirit and scope of the appended claims should not be limited to the description of the preferred versions contained herein.

What is claimed is:

1. A process of removing a contaminant from feed water, the feed water containing at least one contaminant selected from the group consisting of organic contaminants and metal ion contaminants the process comprising the steps of: (a) providing a caustic-treated coal that is self-combustible, having sufficient hydrogen present to be capable of ignition, and substantially hydrophilic; and
    (b) contacting the caustic-treated coal with a feed water at a feed water to coal mass ratio of from about 50:1 to about 20,000:1 for combining the contaminant with the coal, thereby generating contaminant-containing coal and reducing the content of contaminant in the feed water by at least about 80% by weight, the contaminant-containing coal being suitable for self-supporting combustion for disposing of the contaminant.

2. The process of claim 1 further comprising the step of removing at least a portion of the water that has been reduced in contaminant content from the coal.

3. The process of claim 1 further comprising the step of combusting the contaminant-containing coal.

4. The process of claim 1 wherein the contaminant is a metal ion contaminant.

5. The process of claim 4 further comprising the step of combusting the contaminant-containing coal in the presence of a slagging agent.

6. The process of claim 4 wherein the metal ion contaminant comprises at least one of Cd and Ni.

7. The process of claim 1 wherein the contaminant is an organic contaminant.

8. The process of claim 7 wherein the organic contaminant is an aromatic compound.

9. The process of claim 1 wherein the content of contaminant in the feed water is reduced by at least 90% by weight.

10. The process of claim 1 wherein the content of contaminant in the feed water is reduced by at least 95% by weight.

11. The process of claim 1 further comprising the step of contacting the feed water with alkali prior to contacting the water with the caustic-treated coal to raise the pH of the feed water to a pH in the range of from about 7 to about 9.

12. The process of claim 1 further comprising the step of treating the caustic-treated coal, before contact With the feed water from which the contaminant is to be removed, with at least one water-soluble primary or secondary amine and carbon disulfide in the presence of water.

13. The process of claim 12 wherein the amine is selected from the group consisting of hydrazine, ethylenediamine, propylenediamine, butylenediamine, m-phenylenediamine, mixed m, p-xylenediamine, piperazine, propylamine, butylamine, aniline, benzylamine, diethylenetriamine, triethylenetetramine, tetraethylenepentamine, and polyethyleneimine.

14. The process of claim 1 wherein the caustic-treated coal is generated by: (i) treatment of native coal with fused caustic followed by (ii) at least one water wash and at least one acid wash to yield caustic-treated coal having substantially lower sulfur and mineral content than the native coal.

15. The process of claim 14 wherein the acid wash comprises a wash with carbonic acid.

16. The process of claim 14 wherein the acid wash comprises a wash with a strong acid.

17. The process of claim 1 further comprising treatment of the feed water with alum/ferric ion subsequent to contacting the caustic-treated coal with the feed water.

18. A process of removing a contaminant from acidic feed water, the feed water containing at least one contaminant selected from the group consisting of organic contaminants and metal ion contaminants, the process comprising the steps of: ,
    (a) providing a caustic-treated coal that is self-combustible, having sufficient hydrogen present to be capable of ignition, and substantially hydrophilic, the caustic-treated coal retaining sufficient caustic to substantially neutralize the acidity of the feed water; and
    (b) contacting the caustic-treated coal with an acidic feed water at a feed water to coal mass ratio of from about 50:1 to about 20,000:1 for substantially neutralizing the acidity of the feed water and combining the contaminant with the coal, thereby generating contaminant-containing coal and reducing the content of contaminant in the feed water by at least about 80% by weight, the contaminant-containing coal being suitable for self-supporting combustion for disposing of the contaminant.

19. The process of claim 18 further comprising the step of removing at least a portion of the water that has been reduced in contaminant content from the coal.

20. The process of claim 18 further comprising the step of combusting the contaminant-containing coal.

21. The process of claim 18 wherein the contaminant is a metal ion contaminant.

22. The process of claim 21 further comprising the step of combusting the contaminant-containing coal in the presence of a slagging agent.

23. A process of removing a contaminant from feed water, the feed water containing at least one contaminant selected from the group consisting of organic contaminants and metal ion contaminants, the process comprising the steps of:

(a) contacting a feed water with alkali to raise the pH of the feed water to a pH in the range of from about 8 to about 10 to precipitate hydroxides of metal ion contaminants;

(b) removing the precipitated hydroxides from the feed water;

(c) providing a caustic-treated coal that is self-combustible, having sufficient hydrogen present to be capable of ignition, and substantially hydrophilic; and (d) contacting the caustic-treated coal with the feed water from which the precipitated hydroxides have been removed at a water to coal mass ratio of from about 50:1 to about 20,000:1 for combining the contaminant with the coal, thereby generating contaminant-containing coal and reducing the content of contaminant in the feed water by at least about 80% by weight, the contaminant-containing coal being suitable for self-supporting combustion for disposing of the contaminant.

24. The process of claim 23 further comprising the step of removing the water that has been reduced in contaminant content from the coal.

25. The process of claim 23 further comprising the step of combusting the contaminant-containing coal.

26. The process of claim 23 wherein the contaminant is a metal ion contaminant.

27. The process of claim 26 further comprising the step of combusting the contaminant-containing coal in the presence of a slagging agent.

28. The process of claim 26 wherein the metal ion contaminant comprises at least one of Cd and Ni.

29. A process of removing a contaminant from feed water, the feed water containing at least one contaminant selected from the group consisting of organic contaminants and metal ion contaminants, the process comprising the steps of:

(a) contacting a feed water with alkali to raise the pH of the feed water to a pH in the range of from about 7 to about 9;

(b) providing a caustic-treated coal that is self-combustible, having sufficient hydrogen present to be capable of ignition, and substantially hydrophilic;

(c) contacting the caustic-treated coal with the pH-raised feed water at a feed water to coal mass ratio of from about 50:1 to about 20,000:1 for combining the contaminant with the coal, thereby generating contaminant-containing coal and reducing the content of contaminant in the feed water by at least about 80% by weight, the contaminant-containing coal being suitable for self-supporting combustion for disposing of the contaminant;

(d) removing at least a portion of the water that has been reduced in contaminant so that a coal-water slurry remains, the slurry containing coal and water at a water to coal mass ratio lower than the water to coal mass ratio of step (c), the quantity of coal in the coal-water slurry being sufficient to support combustion;

(e) adding a slagging agent to the coal-water slurry in a quantity sufficient to encapsulate metal contaminants in the coal-water slurry; and (f) combusting a combination of the slagging agent and the coal-water slurry such that organic contaminants are destroyed through combustion and metal contaminants are encapsulated in slag for disposal as a non-hazardous waste, and such that heat is produced.

30. The process of claim 29 further comprising using the heat produced in step (f) to generate steam.

31. The process of claim 30 wherein the steam generated is used to generate electric power.

32. The process of claim 29 wherein the content of contaminant in the feed water is reduced by at least 90% by weight.

33. The process of claim 29 wherein the content of contaminant in the feed water is reduced by at least 95% by weight.

34. A process of removing a contaminant from feed water, the feed water containing at least one contaminant selected from the group consisting of organic contaminants and metal ion contaminants, the process comprising the steps of:

(a) contacting a feed water with alkali to raise the pH of the feed water to a pH in the range of from about 7 to about 9;

(b) providing a caustic-treated coal that is self-combustible, having sufficient hydrogen present to be capable of ignition, and substantially hydrophilic;

(c) contacting the caustic-treated coal with the pH-raised feed water in the presence of a slagging agent at a water to coal mass ratio of from about 50:1 to about 20,000:1 for combining the contaminant with the coal, thereby generating contaminant-containing coal and reducing the content of contaminant in the feed water by at least about 80% by weight, the contaminant-containing coal being suitable for self-supporting combustion for disposing of the contaminant;

(d) removing a portion of the feed water that has been reduced in contaminant so that a coal-water-slagging agent slurry remains, the slurry containing coal and water at a water to coal mass ratio lower than the water to coal mass ratio of step (c), the quantity of slagging agent present in the slurry being sufficient to encapsulate metal ion contaminants in the slurry, and the quantity of coal present in the slurry being sufficient to support combustion; and (e) combusting the slurry of step (d) such that organic contaminants are destroyed through combustion and metal ion contaminants are encapsulated in slag, and such that heat is produced.

35. The process of claim 34 wherein the feed water is groundwater located in a groundwater source, and further comprising the steps of: (i) withdrawing the groundwater from the groundwater source and (ii) restoring the water reduced in contaminant content to the groundwater source.

36. The process of claim 35 further comprising using the heat produced in step (e) to generate steam.

37. The process of claim 36 wherein the steam generated is used to generate electric power.

38. The process of claim 34 wherein the content of contaminant in the feed water is reduced by at least 90% by weight.

39. The process of claim 34 wherein the content of contaminant in the feed water is reduced by at least 95% by weight.

40. A process of disposing of a contaminant selected from the group consisting of metal ion contaminants and organic contaminants comprising:

(a) providing a combustion of: (i) caustic-treated coal that is self-combustible, having sufficient hydrogen present to be capable of ignition, and substantially hydrophilic combined with the contaminant, the contaminant-containing coal being suitable for self-supporting combustion for disposing of the contaminant; (ii) water; and (iii) slagging agent;

(b) combusting the combination such that organic contaminants are destroyed through combustion and metal ion contaminants are encapsulated; and (c) disposing of the slag.

41. The process of claim 40 wherein the mass ratio of coal to water in the slurry is about 1:1.

42. The process of claim 40 wherein the combustion occurs in a slagging coal combustor.

43. A process of removing a contaminant from feed water, the feed water containing at least one contaminant selected from the group consisting of organic contaminants and metal ion contaminants, the process comprising the steps of:

(a) providing a caustic-treated coal that is self-combustible, having sufficient hydrogen present to be capable of ignition, and substantially hydrophilic;

(b) providing activated charcoal capable of sorbing the contaminant;

(c) contacting the caustic-treated coal with a feed water at a feed water to coal mass ratio of from about 50:1 to about 20,000:1 for combining the contaminant with the coal, thereby generating contaminant-containing coal and reducing the content of contaminant in the remaining feed water by at least about 80% by weight, the contaminant-containing coal being suitable for self-supporting combustion for disposing of the contaminant; and (d) contacting the feed water remaining from step (c) with the activated charcoal to remove additional contaminant.

44. The process of claim 43 further comprising the step of removing at least a portion of the water that has been reduced in contaminant content from the activated charcoal.

45. The process of claim 43 further comprising the step of combusting the contaminant-containing coal.

46. A process of removing a contaminant from feed water, the feed water containing at least one contaminant selected from the group consisting of organic contaminants and metal ion contaminants, the process comprising the steps of:

(a) providing a mixed bed of sorbent comprising:
  (i) caustic-treated coal that is self-combustible, having sufficient hydrogen present to be capable of ignition, and substantially hydrophilic; and
  (ii) activated charcoal capable of sorbing the contaminant; and (b) contacting the mixed bed of sorbent with a feed water at a feed water to coal mass ratio of from about 50:1 to about 20,000:1 for combining the contaminant with the coal, thereby generating contaminant-containing coal and reducing the content of contaminant in the feed water by at least about 80% by weight, the contaminant-containing coal being suitable for self-supporting combustion for disposing of the contaminant.

47. The process of claim 46 further comprising the step of removing at least a portion of the water that has been reduced in contaminant content from the mixed bed.

* * * * *